June 14, 1955     W. K. FISCHER     2,710,821
ADHESIVE COMPOSITION FOR BONDING POLYPERFLUOROVINYL
CHLORIDE TO METAL
Filed June 4, 1953
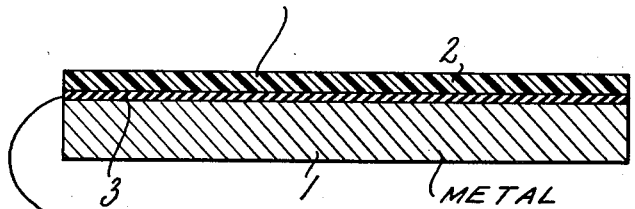
POLYPERFLUOROVINYL CHLORIDE FILM
METAL
ADHESIVE LAYER COMPRISING
1. MALEIC ANHYDRIDE-MODIFIED ELASTOMER
2. POLYCHLOROPRENE, AND
3. A ROSIN ACID
INVENTOR.
WILLIAM K. FISCHER
BY
Robert J. Patterson
ATTORNEY

2,710,821

ADHESIVE COMPOSITION FOR BONDING POLYPERFLUOROVINYL CHLORIDE TO METAL

William K. Fischer, Woodbury, Conn., assignor to United States Rubber Company, New York, N. Y., a corporation of New Jersey Application June 4, 1953, Serial No. 359,639

6 Claims. (Cl. 154—130)

This invention relates to an adhesive composition which is particularly adapted for the bonding of films of polyperfluorovinyl chloride to metals and to a method of effecting such bonding.

Polyperfluorovinyl chloride can be made as outlined by Belmore et al., Industrial and Engineering Chemistry, 39, 338–342 (1947). Films of polyperfluorovinyl chloride are waxy, flexible, non-tacky and transparent and because of their high chemical inertness are quite useful as metal coatings. However, due to the lack of satisfactory adhesives, it has heretofore been necessary to apply these films by flame spraying to roughened metal. In flame spraying, pellets or particles of the polymeric material are dropped or otherwise projected through the flame of a spray gun onto the metal whereby they are caused to melt and adhere. This method is subject to many disadvantages. The method is tedious. The films obtained are porous and uneven. In addition, the films are darkened because of pyrolysis due to the high temperature to which the material is subjected during its application.

Accordingly, it would be highly advantageous if it were possible to secure films of polyperfluorovinyl chloride to the metal surfaces by means of an adhesive. Such a method would make it possible to rapidly and easily bond a film which is elastic, smooth, non-porous, chemically inert, and of uniform thickness to metal.

The present invention provides an adhesive which is adapted to bond polyperfluorovinyl chloride films to metal surfaces. The invention makes it possible to bond such films to metal surfaces in a simple and facile manner and at a relatively low cost. The method of my invention obviates the numerous disadvantages of previous methods of applying polyperfluorovinyl chloride to metal surfaces.

The accompanying drawing portrays diagrammatically in section a laminated article embodying this invention.

My invention is based upon the discovery that mixtures of maleic anhydride-modified high-unsaturation olefinic elastomers, e. g. maleic anhydride-modified butadiene-acrylonitrile rubbery copolymer (Buna N rubber), polychloroprene and an abietic or rosin acid are excellent adhesives for joining polyperfluorovinyl chloride films to metal surfaces. Such mixtures are particularly useful when employed in the form of a solution in a suitable mutual volatile organic solvent to give a fluent composition of suitable consistency, typically ranging from liquid to pasty consistency, for application by the conventional methods used for applying adhesive cement compositions.

The adhesives of my invention can be applied to the surfaces to be joined by roller coating, doctoring, brushing or spraying. Other than the usual cleaning to remove grease and surface dirt such as sand blasting, the surface of the metal needs no special treatment. The preferred mode of bonding in accordance with my invention comprises coating both the metal surface and the surface of the polyperfluorovinyl chloride to be joined thereto with the cement-like composition, allowing the coated surfaces to dry in the air for a short time, typically fifteen to twenty minutes, to remove the major portion of the volatile solvent therefrom, at 70—90° F. and then heating the elements to a suitably elevated temperature, typically of the order of 200° F., for a suitable time, e. g. five to ten minutes, to remove the balance of the volatile organic solvent therefrom. This heating step can be done in an oven if desired.

It is essential that all traces of volatile solvent be removed from the adhesive coatings before bonding together. Otherwise, since the polyperfluorovinyl chloride film is highly impervious to solvent vapor, it would be lifted by subsequent volatilization of solvent, resulting in blistering. Removal of the solvent before bonding can be effected in any suitable way.

The thus prepared surfaces may then be bonded simply by pressing tightly together. The surfaces can be pressed together while they are hot as a result of the heating step, or after they have cooled down somewhat or even to room temperature. The adhesive coating retains its tackiness even when cooled down to room temperature.

The maleic anhydride-modified elastomeric component of my adhesive is preferably prepared in the manner described and claimed in the copending application of Snyder et al., Serial No. 342,748 filed March 16, 1953, which is hereby incorporated by reference in the interests of brevity. French Patent 1,095,954 granted December 29, 1954, corresponds to said application.

Briefly the method of modifying the high-unsaturation olefinic elastomer comprises heating it in intimate admixture with maleic anhydride in amount equal to from 1 to 50% by weight based on the elastomer and an inhibitor of free radical polymerization typically employed in amount equal to from 1 to 10% by weight of the elastomer, at a temperature of at least 150° C., for a suitable length of time. The inhibitor used must be one which is effective, in the proportion used and at the temperature used, to substantially restrain cross-linking during the reaction. For example, a rubbery copolymer of butadiene and acrylonitrile containing 65% combined butadiene and 35% acrylonitrile is intimately mixed with 5% of its weight of maleic anhydride and 1% of its weight of phenyl beta-naphthylamine as an inhibitor at a temperature of 205–210° C. until reaction between the maleic anhydride and the rubbery copolymer is complete, say for 10–20 minutes. The resulting modified elastomer is a rubbery or elastomeric material.

As is disclosed in the aforementioned Snyder et al. application typical inhibitors of free radical polymerization which are operable in the preparation of the maleic anhydride-modified elastomer belong to the following classes: certain of the phenols, the aromatic amines and the quinonoid compounds derived from them by oxidation, and the condensation products of these amines with aldehydes or ketones; the aromatic nitro compounds, and the organic phosphites and phosphates.

Typical phenols and amines which are operable inhibitors in the preparation of the maleic anhydride-modified elastomer component are hydroquinone, p-tert.-butylcatechol, 2,6-di-tert.-butyl-4-methylphenol ("Deenax"), tetrachlorohydroquinone, tert.-butyl-hydroquinone, phenyl beta-naphthylamine ("PBNA"), "Agerite Stalite" (a mixture of alkylated diphenylamines), 2,2,4-trimethyl-1,2-dihydroquinoline and its polymers, dimethylaniline and pyridine. Phenol, the simple cresols and the crude mixture of phenols known as cresylic acid, i. e., phenols which have no practical value as rubber antioxidants or as inhibitors of polymerization, are not suitable for use because they do not adequately suppress cross-linking unless at least about 15 parts per 100 parts (all by weight) of the elastomer are used. Such an amount is entirely impractical because of health hazards, volatility of these phenols, corrosion of equipment, and/or excessive plasticization of the adducts. Therefore, these simple monohydric phenols are excluded from consideration.

Typical quinonoid compounds usable as inhibitors are p-benzoquinone, chloranil and 2,3-dichloronaphthoquinone.

Among the usable aromatic nitro compounds are 2,4-dinitrochlorobenzene and picric acid.

A typical usable ketone-amine condensation product is "BLE" (a mixture of products made by condensing acetone with diphenylamine).

The preferred phosphorus-containing inhibitors are the aryl phosphites. Other operable inhibitors are the alkyl phosphites and the phosphate esters described by Hunter in U. S. Patent No. 2,587,477.

The usable aryl phosphites include the triaryl phosphites and the various substituted-triaryl phosphites, and mixed alkyl aryl phosphites, among which are: triphenyl phosphite, trinaphthyl phosphite, tri(tertiary-amyl-phenyl) phosphite, trixenyl phosphite, phenyl diethyl phosphite, ethyl diphenyl phosphite, tri-tolyl phosphite, tri(butylphenyl) phosphite, tri(chlorophenyl) phosphite, tri(isopropylphenyl) phosphite, tri(benzyloxyphenyl) phosphite, tri(amyl-phenyl) phosphite, tri(octylphenyl) phosphite, tri(nonyl-phenyl) phosphite, tri(dodecylphenyl) phosphite, octylphenyl di(nonyl-phenyl) phosphite, tris(di-octyl-phenyl) phosphite, nonyl-phenyl di(octyl-phenyl) phosphite, or mixtures thereof. Other usable phosphates and phosphites include n-butyl-dihydrogen phosphate, di-n-butyl-hydrogen phosphate, di-n-butyl-hydrogen phosphite, tri-n-butyl phosphite, di-2-ethylhexyl phosphite, etc., and mixtures thereof.

While all of these classes of inhibitors of free radical polymerization are useful they are not entirely interchangeable. This becomes clear when it is understood that the inhibitors perform at least two, and in most cases three, functions in forming and stabilizing the maleic anhydride-modified elastomer. First, they suppress the cross-linking which tends to take place during formation of the maleic anhydride-modified elastomer. Second, they inhibit a cross-linking reaction, which might otherwise take place during storage of the maleic anhydride-modified elastomer at room temperatures. Third, some of them inhibit a further, self-cross-linking reaction: this reaction takes place, apparently, only at the temperatures at which the desired reaction with maleic anhydride occurs, and is unique in that it is believed to be the same sort of reaction which causes resinification of GR–S and GR–A (Buna N) at high temperatures. All of the inhibitors mentioned above are effective in suppressing the first two cross-linking reactions, although more of some inhibitors is required than of others to obtain equivalent results. In general, the phenolic and amine inhibitors are preferred for this purpose. In some cases as little as one part of inhibitor per 100 parts of elastomer is sufficient. The preferred inhibitors for this purpose are p-tert.-butyl-catechol, "PBNA," "BLE" and Deenax.

The aryl phosphites are less active than the other useable inhibitors in suppressing the first two types of cross-linking mentioned above; consequently, when no other inhibitor but a phosphite is present, it is preferred to use 4–5 parts of the phosphite per 100 parts of elastomer. The aryl phosphites are by far the most powerful of the inhibitors in suppressing the third, or self-cross-linking reaction. Consequently, for economy coupled with the formation of a modified elastomer of superior processability, it is preferred to carry out the reaction in the presence of a mixture of an aryl phosphite and a highly reactive amine or phenolic inhibitor. Usually one part of each of the two inhibitors, in addition to the amount that normally is mixed into the Buna N elastomer during manufacture, is sufficient to give optimum processing properties to the newly-made adduct. However, most of this amount of inhibitor is probably used up chemically or is volatilized during formation of the adduct. Therefore, to ensure that the modified elastomer has optimum storage stability, one to two parts of one or more of preferred amine or phenolic inhibitors is usually mixed into the adduct just before it is removed from the equipment in which it is formed.

The total useful amount of an inhibitor or mixture of inhibitors varies from about one part to about ten parts per 100 parts of elastomer. The use of more than about ten parts of inhibitor not only is wasteful but also may unduly plasticize the maleic anhydride-modified elastomer or may volatilize from the equipment wherein it is formed, to such an extent as to be a discomfort or hazard to personnel. The preferred total amount of inhibitor ranges approximately between four and six parts. Usually, as the amount of maleic anhydride is increased, it is advisable to increase the total amount of inhibitor slightly.

In the typical practice of my invention, I mix the maleic anhydride-modified elastomeric material with the polychloroprene ingredient and break the resulting mixture down on a cold open rubber mill until it is tacky and free from nerve. I then dissolve the resulting mixture in a mutual volatile organic solvent such as a mixture of 70 parts toluene and 10 parts methyl ethyl ketone. Into this mixture, the abietic or rosin acid is then dissolved.

Any of the well-known polychloroprenes can be used. An example is that known as Neoprene GN.

In place of butadiene-acrylonitrile copolymer as the elastomer which is chemically modified by reaction with maleic anhydride, I can use any other high-unsaturation olefinic elastomer, e. g. natural rubber, a rubbery copolymer of butadiene with styrene or a rubbery copolymer of butadiene with methyl methacrylate.

A preferred abietic or rosin acid used in my invention is dehydroabietic acid. Alternatively I can use abietic acid itself, disproportionated abietic acid, dihydroabietic acid, tetrahydroabietic acid, isomerized rosin or hydrogenated rosin.

Any solid metal can be protected with polyperfluorovinyl chloride in accordance with my invention. Examples of suitable metals are steel, aluminum and copper.

I prefer to employ polychloroprene in amount equal to from 10 to 65 parts by weight per 100 parts of the maleic anhydride-modified rubbery material. I prefer that the amount of rosin acid employed be equal to from 75 to 150 parts per 100 parts of the maleic anhydride-modified elastomeric material. I prefer to dissolve the three solid ingredients in the mutual volatile organic solvent to form a fluent composition containing from 10 to 40% by weight of the three solid ingredients.

With the resulting formulation, I can incorporate pigments which may be of either the coloring type, e. g., titanium dioxide, zinc chromate, etc., or of the reinforcing type, e. g., carbon black, precipitated hydrated calcium silicate, precipitated hydrated silica, etc.

In the drawing, a metal layer 1 is shown as having a polyperfluorovinyl chloride film 2 attached thereto by means of adhesive layer 3 which is formulated in accordance with my invention.

*Examples*

The following examples illustrate my invention more fully. Examples I and VII are included for comparative purposes and are not within the invention.

The bond strength values were determined by first coating both surfaces to be bonded, air drying fifteen minutes, oven heating at 200° F. for ten minutes and then pressing together, after which the force required to pull the film of polyperfluorovinyl chloride from the metal was determined.

| Example | I | II | III | IV | V | VI | VII |
|---|---|---|---|---|---|---|---|
| Ingredient: | | | | | | | |
| Maleic Anhydride-Modified Buna N Rubber* parts by weight | | 5 | 10 | 12.5 | 15 | 17.5 | 20 |
| Polychloroprene (Neoprene GN) parts by weight | 20 | 15 | 10 | 7.5 | 5 | 2.5 | |
| Dehydroabietic acid parts by weight | 15 | 15 | 15 | 15 | 15 | 15 | 15 |
| Toluene do | 70 | 70 | 70 | 70 | 70 | 70 | 70 |
| Methyl Ethyl Ketone parts by weight | 10 | 10 | 10 | 10 | 10 | 10 | 10 |
| Bond Strength (lbs. per inch width) | 7.2 | 9.2 | 11.10 | 16 | 20 | 18 | 0.5 |

*Made by heating a rubbery copolymer ("Paracril") of 65% combined butadiene and 35% acrylonitrile with 5% of its weight of maleic anhydride in the presence of 1% of its weight of phenyl beta-naphthylamine at 205-210° C. in a Banbury mixer for 20 minutes.

The formulation of Example V is the most highly preferred.

The compositions of Examples I to IV show a progressive tendency to fail at the metal. Formulations low in polychloroprene, e. g. that of Example VI, fail at the film.

As will be obvious to those skilled in the art, instead of using a mixture of toluene and methyl ethyl ketone as the solvent, I may use any other suitable volatile organic solvent such as an ester, high flash naphtha, methyl isobutyl ketone, etc.

Having thus described my invention, what I claim and desire to protect by Letters Patent is:

1. A composition of matter comprising a maleic anhydride-modified butadiene-acrylonitrile rubbery copolymer obtained by heating butadiene-acrylonitrile rubbery copolymer in intimate admixture with from 1 to 50% of its weight of maleic anhydride and with from 1 to 10% of its weight of an inhibitor of free radical polymerization at a temperature of at least 150° C. until reaction between said copolymer and said maleic anhydride is complete, said inhibitor being one which is effective in the said proportion and at the said temperature to substantially restrain cross-linking during said reaction, polychloroprene in amount equal to from 10 to 65 parts by weight per 100 parts of said modified rubbery copolymer, and a rosin acid selected from the group consisting of abietic acid, dehydroabietic acid, disproportionated abietic acid, dihydroabietic acid, tetrahydroabietic acid, isomerized rosin and hydrogenated rosin, the amount of said rosin acid being equal to from 75 to 150 parts per 100 parts of said modified rubbery copolymer, the foregoing ingredients being dissolved in a mutual volatile organic solvent.

2. An adhesive composition particularly adapted for bonding films of polyperfluorovinyl chloride to metal surfaces, said composition comprising a maleic anhydride-modified butadiene-acrylonitrile rubbery copolymer obtained by heating butadiene-acrylonitrile rubbery copolymer in intimate admixture with from 1 to 50% of its weight of maleic anhydride and with from 1 to 10% of its weight of an inhibitor of free radical polymerization at a temperature of at least 150° C. until reaction between said copolymer and said maleic anhydride is complete, said inhibitor being one which is effective in the said proportion and at the said temperature to substantially restrain cross-linking during said reaction, polychloroprene in amount equal to from 10 to 65 parts by weight per 100 parts of said modified rubbery copolymer, and dehydroabietic acid in amount equal to from 75 to 150 parts per 100 parts of said modified rubbery copolymer, the foregoing ingredients being dissolved in a mutual volatile organic solvent to form a fluent composition containing from 10 to 40% by weight of said ingredients.

3. The method of bonding a film of polyperfluorovinyl chloride to a metal surface which comprises coating both surfaces to be joined with a composition as defined in claim 2, partially removing solvent by evaporation, heating the coated surfaces to remove the balance of the solvent and pressing the thus-coated surfaces together.

4. An adhesive composition particularly adapted for bonding films of polyperfluorovinyl chloride to metal surfaces, said composition comprising the following ingredients in the indicated proportions:

|  | Parts by weight |
|---|---|
| Maleic anhydride-modified rubbery butadiene-acrylonitrile copolymer [1] | 15 |
| Polychloroprene | 5 |
| Dehydroabietic acid | 15 |
| Toluene | 70 |
| Methyl ethyl ketone | 10 |

[1] Made by heating a butadiene-acrylonitrile rubbery copolymer with 5% of its weight of maleic anhydride and with 1% of its weight of phenyl beta-naphthylamine at 205–210° C. in an internal mixer for twenty minutes.

5. A composition of matter comprising a maleic anhydride-modified butadiene-acrylonitrile rubbery copolymer obtained by heating butadiene-acrylonitrile rubbery copolymer in intimate admixture with from 1 to 50% of its weight of maleic anhydride and with from 1 to 10% of its weight of phenyl beta-naphthylamine as an inhibitor of free radical polymerization at a temperature of at least 150° C. until reaction between said copolymer and said maleic anhydride is complete, polychloroprene in amount equal to from 10 to 65 parts by weight per 100 parts of said modified rubbery copolymer, and a rosin acid selected from the group consisting of abietic acid, dehydroabietic acid, disproportionated abietic acid, dihydroabietic acid, tetrahydroabietic acid, isomerized rosin and hydrogenated rosin, the amount of said rosin acid being equal to from 75 to 150 parts per 100 parts of said modified rubbery copolymer, the foregoing ingredients being dissolved in a mutual volatile organic solvent.

6. An adhesive composition particularly adapted for bonding films of polyperfluorovinyl chloride to metal surfaces, said composition comprising a maleic anhydride-modified butadiene-acrylonitrile rubbery copolymer obtained by heating butadiene-acrylonitrile rubbery copolymer in intimate admixture with from 1 to 50% of its weight of maleic anhydride and with from 1 to 10% of its weight of phenyl beta-naphthylamine as an inhibitor of free radical polymerization at a temperature of at least 150° C. until reaction between said copolymer and said maleic anhydride is complete, polychloroprene in amount equal to from 10 to 65 parts by weight per 100 parts of said modified rubbery copolymer, and dehydroabietic acid in amount equal to from 75 to 150 parts per 100 parts of said modified rubbery copolymer, the foregoing ingredients being dissolved in a mutual volatile organic solvent to form a fluent composition containing from 10 to 40% by weight of said ingredients.

References Cited in the file of this patent

UNITED STATES PATENTS

| 2,213,954 | Crawford | Sept. 10, 1940 |
| 2,226,541 | Browne | Dec. 31, 1940 |
| 2,373,614 | Szegvari et al. | Apr. 10, 1945 |
| 2,376,854 | Saunders | May 22, 1945 |
| 2,381,267 | Drake | Aug. 7, 1945 |
| 2,576,148 | Schechtman | Nov. 27, 1951 |
| 2,653,884 | Hussey et al. | Sept. 29, 1953 |

OTHER REFERENCES

Del Monte: The Technology of Adhesives, Reinhold, published 1947, pages 200, 202.